(12) United States Patent
Karunakaran et al.

(10) Patent No.: US 10,193,865 B2
(45) Date of Patent: Jan. 29, 2019

(54) CONVERTING MOBILE TRAFFIC BETWEEN IP VPN AND TRANSPORT LEVEL VPN

(71) Applicant: MOBILE IRON, INC., Mountain View, CA (US)

(72) Inventors: Kumara Das Karunakaran, San Jose, CA (US); Alexei Volkov, Mountain View, CA (US); Pranav Desai, Bangalore (IN); Victor Pavlov, Palo Alto, CA (US)

(73) Assignee: MOBILE IRON, INC., Mountain View, CA (US)

( * ) Notice: Subject to any disclaimer, the term of this patent is extended or adjusted under 35 U.S.C. 154(b) by 346 days.

(21) Appl. No.: 15/073,328

(22) Filed: Mar. 17, 2016

(65) Prior Publication Data

US 2016/0277359 A1 Sep. 22, 2016

Related U.S. Application Data

(60) Provisional application No. 62/136,242, filed on Mar. 20, 2015.

(51) Int. Cl.
*G06F 9/00* (2006.01)
*G06F 15/16* (2006.01)
(Continued)

(52) U.S. Cl.
CPC ...... *H04L 63/0272* (2013.01); *H04L 61/2514* (2013.01); *H04L 65/105* (2013.01);
(Continued)

(58) Field of Classification Search
None
See application file for complete search history.

(56) References Cited

U.S. PATENT DOCUMENTS 6,832,322 B1 * 12/2004 Boden ............... H04L 29/12481
726/15
8,095,876 B1 * 1/2012 Verstak ............... G06F 17/2288
715/273
(Continued)

OTHER PUBLICATIONS

RCF2663—P. Srisuresh and M. Holdrege—IP Network Address Translator (NAT) Terminology and Considerations, Aug. 1999, Lucent Technologies.*
(Continued)

*Primary Examiner* — Kambiz Zand
*Assistant Examiner* — Arezoo Sherkat
(74) *Attorney, Agent, or Firm* — Van Pelt, Yi & James LLP (57) ABSTRACT

Techniques described herein convert mobile traffic between different types of VPN protocols, including IP and Transport. In an embodiment, a security proxy associated with a server receives a packet associated with a client app on a device, the packet including a source identifier and a destination identifier. The security proxy reassigns a tunnel identifier as the source and a node identifier as the destination, then stores a correlation of the tunnel identifier, the source identifier, and the destination identifier. The security proxy forwards the packet to the node inside the security proxy, and determines the destination identifier based on the correlation. The node then forwards the packet to the destination. This allows for multiple devices to use a same source identifier, e.g., same IP address. In some embodiments, a secure connection is established and/or the device and server are mutually authenticated prior to the processing of the packets.

20 Claims, 5 Drawing Sheets

(51) Int. Cl.
*G06F 17/00* (2006.01)
*H04L 29/06* (2006.01)
*H04L 29/12* (2006.01)
*H04W 12/02* (2009.01)
*H04W 88/02* (2009.01)

(52) U.S. Cl.
CPC ......... *H04L 65/1069* (2013.01); *H04W 12/02* (2013.01); *H04L 61/2007* (2013.01); *H04L 61/2592* (2013.01); *H04L 63/0281* (2013.01); *H04W 88/02* (2013.01)

(56) References Cited

U.S. PATENT DOCUMENTS

| | | | |
|---|---|---|---|
| 8,259,571 | B1 | 9/2012 | Raphel |
| 8,296,437 | B2 * | 10/2012 | Pankratov ......... H04L 29/12528 709/227 |
| 8,458,786 | B1 | 6/2013 | Kailash et al. |
| 9,888,042 | B2 * | 2/2018 | Annamalaisami ........................... H04L 65/1069 |
| 2005/0080884 | A1 | 4/2005 | Siorpaes et al. |
| 2007/0008924 | A1 | 1/2007 | Moran |
| 2009/0222906 | A1 * | 9/2009 | Brandstatter ....... H04L 63/0272 726/15 |
| 2010/0161960 | A1 * | 6/2010 | Sadasivan ........... H04L 63/0272 713/152 |
| 2013/0103834 | A1 * | 4/2013 | Dzerve ................... H04L 67/10 709/225 |
| 2013/0133043 | A1 | 5/2013 | Barkie |
| 2014/0140213 | A1 | 5/2014 | Raleigh et al. |
| 2014/0331274 | A1 * | 11/2014 | Bitton ................. H04L 63/1408 726/1 |
| 2015/0052599 | A1 | 2/2015 | Champagne |
| 2015/0281408 | A1 * | 10/2015 | Kwan ................. H04L 63/0272 370/474 |
| 2016/0226815 | A1 * | 8/2016 | Wan .................... H04L 61/2007 |

OTHER PUBLICATIONS

Yanjun Zhu et al.: "SSL VPN System Based on Simulated Virtual NIC", 2013 Fourth International Conference on Networking and Distributed Computing, IEEE, Dec. 21, 2013 (Dec. 21, 2013), pp. 70-74, XP032657975, ISSN: 2165-4999, DOI: 10.1109/ICNDC.2013.42 [retrieved on Oct. 9, 2104].

* cited by examiner

FIG. 2B
250

US 10,193,865 B2

CONVERTING MOBILE TRAFFIC BETWEEN IP VPN AND TRANSPORT LEVEL VPN

CROSS REFERENCE TO OTHER APPLICATIONS

This application claims priority to U.S. Provisional Patent Application No. 62/136,242 entitled CONVERTING MOBILE TRAFFIC BETWEEN IP VPN AND TRANSPORT LEVEL VPN filed Mar. 20, 2015 which is incorporated herein by reference for all purposes.

BACKGROUND OF THE INVENTION

A virtual private network (VPN) is a mechanism that allows for secure communications with a private network over a public network. For example, a VPN allows users to access a corporate intranet while away from the office. A VPN extends a private network over a public network by creating a tunnel, which is a virtual point-to-point link between a pair of nodes that are separated by any number of networks. Conventionally, a VPN is implemented either at the Internet layer or the Transport layer. Some operating systems such as Windows® and Android® support IP VPN (Internet layer), while other operating systems such as iOS® support TCP VPN (Transport layer). It is challenging to support devices that use different types of VPN protocols. For example, a corporate intranet might only accommodate Internet layer VPN and be unable to support Transport layer VPN or vice versa.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional VPNs provide secure communications between a remote device and a private network by establishing a secure tunnel between the remote device and the private network such that the remote device is able to send and receive data across shared or public network(s). Tunnel endpoints are authenticated and network configuration parameters are distributed between the endpoints. For example, a VPN client on the remote device requests its IP address from the VPN server via a protocol such as Dynamic Host Configuration Protocol (DHCP). The private network distributes its IP address to the remote device. The VPN connection is then established and communications via the tunnel are secure despite being over untrusted public networks. The VPN connection effectively treats the device as a node plugged into the private network.

One type of VPN operates at the IP level. For example, an Internet Protocol Security (IPsec) VPN is a type of VPN in which the VPN client communicates with a remote VPN server using a control protocol such as Internet Key Exchange (IKE), a tunneling protocol such as IPsec, and a routing protocol. A packet can include a header with IP encryption information (the header is added by the VPN) and a payload. The receiving VPN server can verify the source using the IP header and encryption information and route the packet to an appropriate destination. Each level in the OSI model will add a header to the packet, which can be costly. To use IP level VPN, employers typically need to install vendor-supplied VPN clients. IT administrators typically need to ensure that every remote host is correctly configured and malware-free because IPsec tunnels join hosts to a corporate network, which brings the hosts inside the security perimeter of the corporate network.

Another type of VPN operates at the transport level (also referred to as "TCP VPN"). For example, a Secure Sockets Layer (SSL) VPN is a type of VPN that encrypts traffic between endpoints using SSL protocols (including TLS and the like). SSL VPN typically does not require installation of specialized software at the remote device. Instead, the remote device can connect to a corporate network using a Web browser and its native tunneling protocols where encryption is provided by HTTP messages sent by Web applications. SSL VPN does not require installing an IPsec VPN client, allowing for "client-less" access, which reduces client administration costs and accommodates diverse users and devices.

However, conventional VPNs do not support both IP VPN and SSL VPN. Both endpoints need to use the same type of VPN protocol (IP or TCP) in order to establish a tunnel.

Techniques of the present disclosure convert IP mobile traffic operating under IP VPN and TCP VPN. For example, IP packets can be sent and received inside different types of protocols including IPsec, SSL, and the like using VPN. The techniques described herein are scalable and efficient, finding application in a variety of systems and processors including a gateway that supports HTTP and TCP tunneling with a proxy architecture and various types of VPN clients including plug-ins that encode and decode packets (e.g., Windows®) and file descriptor systems (e.g., Android®). In some embodiments, in a plug-in architecture, the plug-in encapsulates and decapsulates packets to provide tunneling. The plug-in receives IP packets that need to be tunneled, encapsulates the packets, and outputs the encapsulated packets via the tunnel connection to the corporate network. In the reverse direction, the plug-in receives packets from the corporate network, decapsulates the packets, and outputs the decapsulated packets to the IP stack of the client device. In a file descriptor architecture, reading from the file descriptor obtains packets for tunneling to the private network, and writing to the file descriptor forwards packets coming from the private network to a client operating system.

Figure 1:
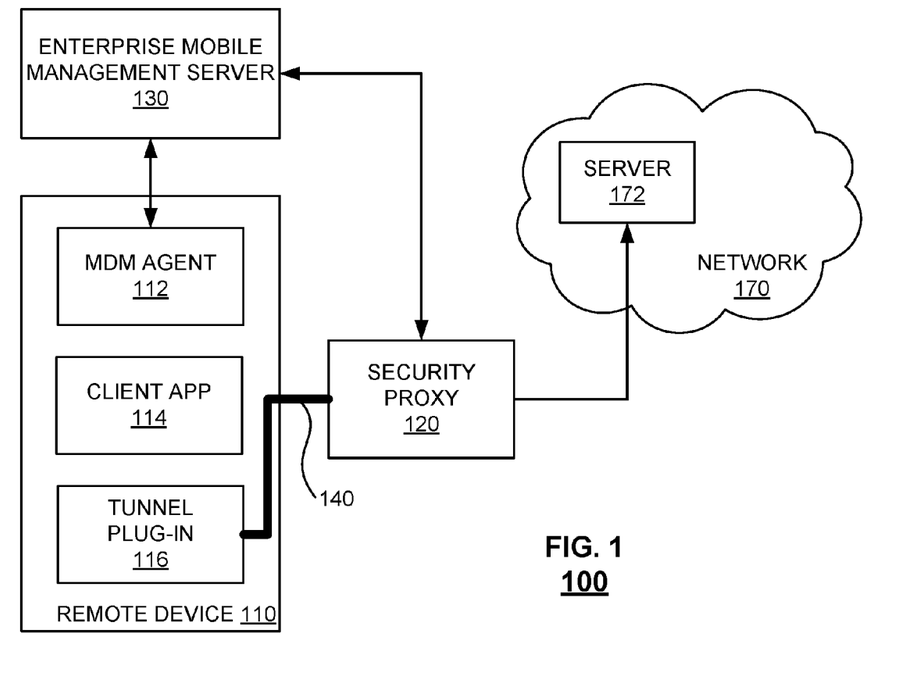
FIG. 1 is a block diagram illustrating an embodiment of a system for establishing a virtual private network (VPN).

FIG. 1 is a block diagram illustrating an embodiment of a system 100 to provide secure mobile access to a network. The system includes a device 110, a security proxy 120, and an enterprise mobile management server (EMM) 130. The system provides secure communications between the remote device 110 and the network 170. In various embodiments, mobile traffic from the client app 114 is routed to the network 170 via a tunnel 140. The security proxy can convert mobile traffic between different VPN protocols such as IP VPN and TCP VPN.

The device 110 includes a mobile device management (MDM) agent 112, a client app 114, and a tunnel plug-in 116. The (MDM) agent 112 may include one or both of a native MDM client and/or functionality of a mobile operating system (e.g., iOS®, Android®) of the mobile device 110 and a third party MDM client, agent, and/or app, e.g., one provided by a third party mobility management provider, such as Mobile Iron, Inc.

In the example shown in FIG. 1, a client app 114 is installed on the remote device 110 and configured to be used to access a network 170. Examples of network 170 include, without limitation, a private network, an intranet, a local-area network (LAN), and a corporate network. In various embodiments, the network may be accessed by one or more of a browser, e.g., a native Web browser or a third party browser; a native client app; a third party client app associated with the network(s), e.g., one provided by the service; and a third party client app that is not provided by the network but which can be used and/or configured to access the network.

In the example shown in FIG. 1, a tunnel plug-in 116 is installed on device 110. In various embodiments, tunnel plug-in 116 may be configured to establish a secure tunnel 140 to a tunnel server (not shown) running on security proxy server or other server system 120. The tunnel plug-in 116 may selectively direct traffic associated with client app 114 to one or more destinations in the network 170. In the example shown in FIG. 1, the destination is server 172.

In some embodiments, EMM server 130 is a virtual service platform. The EMM may be configured to configure the mobile device 110 to be managed by the EMM server 130 and associated elements, such as security proxy 120. EMM server 130 may be configured to establish MDM control over mobile device 110 via MDM agent 112, such as by causing an associated MDM agent 112 to be installed on the device and/or by configuring a native MDM functionality of mobile device 110. In various embodiments, client app 114 may be brought under management by EMM server 130 and/or MDM agent 112. For example, a configuration profile or other configuration data may be provided to ensure that connection requests and/or other traffic associated with client app 114 is sent via and/or under supervision of tunnel plug-in 116.

The security proxy 120 is configured to perform the techniques described herein to convert mobile traffic between different types of VPNs and provide secure communications between the remote device 110 and the network 170, where the VPN protocol can be of various types (IP, Transport, etc.). The security proxy can be implemented as an in-line gateway that manages, encrypts, and secures traffic between the mobile device and back-end systems.

In operation, secure communication is established between the remote device 110 and the network 170. The remote device 110 requests access to the network 170. The security, configuration, and/or other posture of the remote device may be determined by referencing the EMM server 130, e.g., to determine whether the remote device currently has permission to access the network. For example, permission can be established when a user of mobile device 110 registers the device, e.g., via an EMM server 130, and may be revoked at a given time based on a policy, such as upon detecting an unauthorized configuration and/or state of the device 110. Upon authentication, tunnel 140 is established. In various embodiments, secure tunnel 140 may be established based at least in part on a certificate provisioned to tunnel plug-in 116, e.g., a certificate provided to tunnel plug-in 116 by EMM server 130.

The security proxy 120 is initialized, as further described herein. The tunnel plug-in 116 selectively directs traffic associated with client app 114. For example, tunnel plug-in 116 may be configured to forward traffic addressed by client app 114 to the network 170 via tunnel 140. The traffic can be addressed to nodes associated with security proxy server 120. The security proxy 120 can terminate a TCP connection associated with the network 170 and/or the server 172 and route packets to destination nodes in the network 170 according to the techniques described herein.

In some embodiments, client app 114 may address all traffic to destinations in the network 170, and the mobile or other operating system (e.g., Android®, Microsoft Windows®) may be configured (e.g., by the MDM server or other MDM authority) to send selected app traffic directly to network 170 and other traffic from the same app only via a tunnel, such as tunnel 140.

Figure 2A:
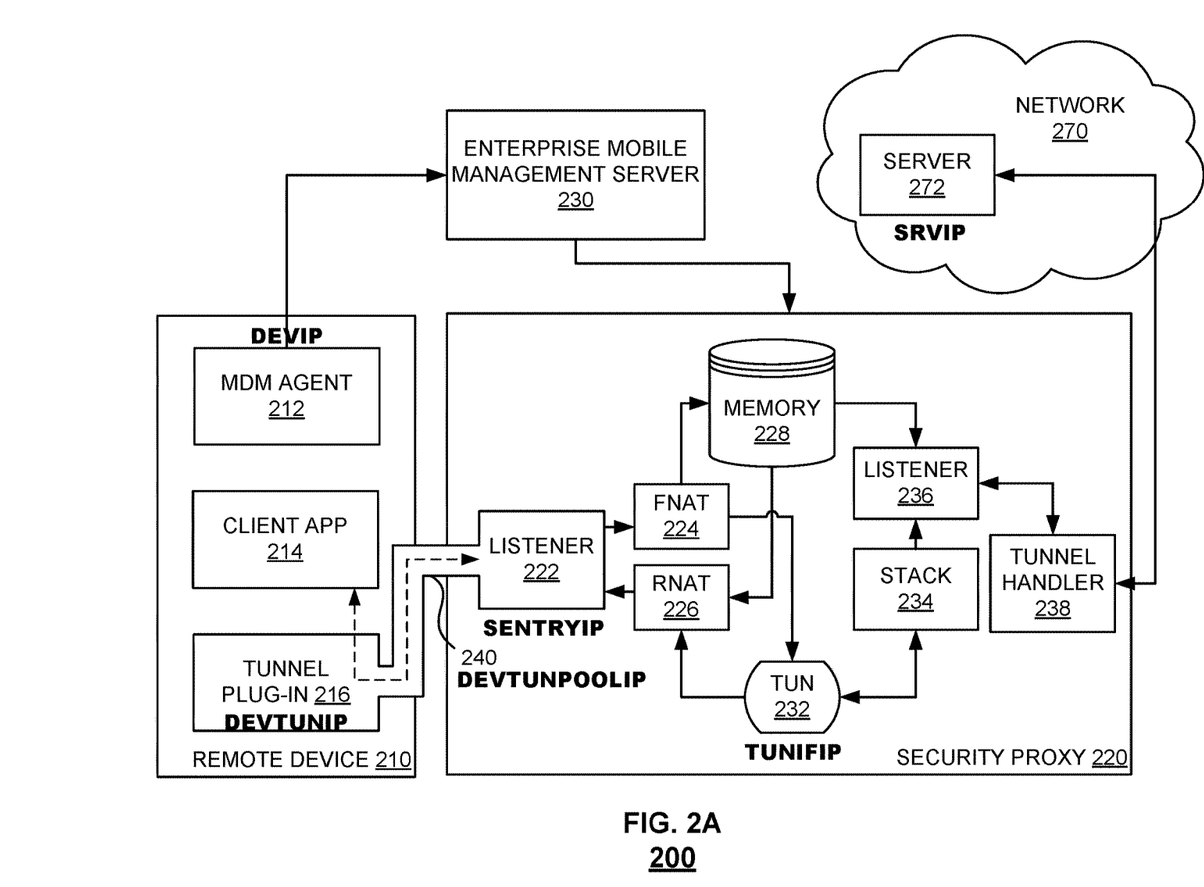
FIG. 2A is a block diagram illustrating an embodiment of a system for converting mobile traffic between different types of VPNs.

FIG. 2A is a block diagram illustrating an embodiment of a system 200 to provide secure mobile access to a network. In various embodiments, the system provides a secure communication path between the (private) network 270 and the remote device 210.

In the example shown, the system includes a device 210, a security proxy 220, and an EMM 230. The system provides secure communications between the remote device 210 and the network 270. In various embodiments, mobile traffic from the client app 214 is routed to the network 270 via a tunnel 240. The routing in various embodiments enables mobile traffic to be converted between different VPN protocols such as IP VPN and TCP VPN.

The device 210 includes an MDM agent 212, a client app 214, and a tunnel plug-in 116. The (MDM) agent 212 may include one or both of a native MDM client and/or functionality of a mobile operating system (e.g., iOS®, Android®) of the mobile device 210 and a third party MDM client, agent, and/or app, e.g., one provided by a third party mobility management provider, such as Mobile Iron, Inc.

In the example shown in FIG. 2A, a client app 214 is installed on the remote device 210 and configured to be used to access a network 270. Examples of network 270 include, without limitation, a private network, an intranet, a local-area network (LAN), and a corporate network. In various embodiments, the network may be accessed by one or more of a native client app; a third party client app associated with the network(s), e.g., one provided by the service; and a third party client app that is not provided by the network but which can be used and/or configured to access the network. Although not shown, the remote device 210 can include a plurality of client apps.

In the example shown in FIG. 2A, a tunnel plug-in 216 is installed on device 210. In various embodiments, tunnel plug-in 216 may be configured to establish a secure tunnel 240 to a tunnel server (not shown) running on security proxy server or other server system 220. The tunnel plug-in 216 may selectively direct traffic associated with client app 214 to one or more destinations in the network 270. In the example shown in FIG. 2A, the destination is server 272.

The tunnel 240 can be established after mutual authentication (e.g., certificate-based) of the remote device and the network. In various embodiments, the tunnel is an HTTPS tunnel that accommodates IP traffic.

The EMM server 230 may be a virtual service platform. The EMM may be configured to configure the mobile device 210 to be managed by the EMM server 230 and associated elements, such as security proxy 220. EMM server 230 may be configured to establish MDM control over mobile device 210 via MDM agent 212, such as by causing an associated MDM agent 212 to be installed on the device and/or by configuring a native MDM functionality of mobile device 210. In various embodiments, client app 214 may be brought under management by EMM server 230 and/or MDM agent 212. For example, a configuration profile or other configuration data may be provided to ensure that connection requests and/or other traffic associated with client app 214 is sent via and/or under supervision of tunnel plug-in 216.

The security proxy 220 includes a listener 222, forward network address translation (FNAT) module 224, reverse network address translation (RNAT) module 226, memory 228, a listener 236, IP stack 234, and tunnel handler 238. In various embodiments, the security proxy 220 includes a network tunnel interface (TUN, e.g., a Linux kernel-provided "TUN" interface) 232 that in various embodiments enables IP traffic to be accessed. The security proxy 220 is configured to perform the techniques described herein to convert mobile traffic between different types of VPNs and provide secure communications between the remote device 210 and the network 270, where the VPN protocol can be of various types (IP, Transport, etc.). The security proxy can be implemented as an in-line gateway that manages, encrypts, and secures traffic between the mobile device and back-end systems. The security proxy can support HTTP and TCP tunneling with a proxy architecture.

The listener 222 receives traffic from remote device 210 over tunnel 240. Using the example of TCP, the listener can be an HTTPS port such as :443. In the example of FIG. 2A, the listener 222 is assigned an address of "SENTRYIP," indicating, for example, that it is an IP address of a security proxy, such as a SENTRY proxy server sold by Mobile Iron, Inc.

The FNAT 224 maps an IP address space into another address space by modifying network address information in received IP packet headers. The FNAT can be used to hide an entire IP address space such as private network IP addresses behind a single IP address in another space such as a public address space. The FNAT can be implemented by a translation table such that reverse communications are mapped to originating IP addresses using rules (or states) stored in the translation tables. Upon assigning mapping rules for a received packet, the translation tables can be stored in the memory 228, as further described herein. The RNAT 226 can perform operations complementary to the FNAT to perform a reverse lookup of IP addresses. In various embodiments, the FNAT is used in a forward data path and the RNAT is used in a reverse data path.

Memory 228 stores an identity of a packet's source and destination. For example, the memory can store translation tables containing source and destination IP addresses and corresponding ports. The storage 228 can be implemented by any type of memory. The storage can include, for example, one or more random access memories (RAM) and/or one or more read-only memories (ROM). As is well known in the art, memory can be used as a general storage area, a temporary (e.g., scratch pad) memory, and/or a cache memory. Memory can also be used to store input data and processed data. Memory can include any suitable computer readable storage media, depending on whether, for example, data access needs to be bi-directional or unidirectional. For example, components of security proxy 220 can also directly and very rapidly retrieve and store frequently needed data in a cache memory included in memory.

The TUN 232 is an interface that cooperates with the stack 234 to process received packets in an ordered manner. In various embodiments, the TUN is implemented by a virtual network kernel device such as a Linux® TUN. The TUN can be set up according to an initialization script that creates a Linux® TUN interface and assigns the TUN an IP address. The assignment of the IP address configures the TUN as a default destination device for return traffic, allowing for a return packet to be returned to the requesting remote device, even where the requesting remote device shares the same IP address as other devices, as further described herein. In the example of FIG. 2A, the TUN 232 is assigned an address of "TUNIFIP."

In various embodiments, use of the Linux® TUN interface enables the security proxy 220 to terminate a TCP connection that a device such as remote device 210 has requested to establish to a server such as server 272. Traffic sent by the remote device 210 to the server 272 is received at security proxy 220, as disclosed herein, and is sent to server 272 via a secure (e.g., TLS) connection by security proxy 220 on behalf of remote device 210. Return traffic from server 272 received on the same connection can be routed back to remote device 210 as described herein.

Referring further to FIG. 2A, in various embodiments, the listener 236 receives data from memory 228 and the IP stack 234. For example, the listener 236 receives a NAT translation state from cache and data from the IP stack. Using the example of TCP, the listener can be a :11111 port receiving items off a Linux® stack.

The stack 234 stores and orders packets and oversees guaranteed delivery for TCP connections. In various embodiments, the stack handles fragmentation and reassembly of IP datagrams. The stack can protect apps from various network-level attacks. In cooperation with the TUN 232, the stack processes packets in an ordered manner. In various embodiments, the stack is a Linux® IP stack.

The tunnel handler 238 interfaces with the network 270. In the example of FIG. 2A, the tunnel handler 238 is communicatively coupled to server 272. In various embodiments, the tunnel handler is a TCP/UDP proxy that receives packets and outputs them to the server. Other services such as security mechanisms, marking, blocking, forwarding via a proxy, and recording frames can be performed by the tunnel handler. In this way, transport level VPNs can be performed for IP level VPN.

The network 270 includes a server 272. In the example of FIG. 2A, the server 272 is assigned an address of "SRVIP."

The system 200 is shown with example labels for IP addresses assigned to the shown components. DEVTUNIP is an IP address assigned to the remote device 210 when tunnel 240 is established. Traffic from apps on the phone destined for the network will use this as the source IP address. In various embodiments, multiple devices connecting to the sentry use the same IP address. This is advantageous because this simplifies routing and TUN interface management. For example, if there is a loss of power, all devices can be reassigned the same address instead of looking up each individual address. As another example, for horizontal scaling, any number of proxies can be added to a load-balanced poll without handling state sharing across proxies. Devices are differentiated in translation tables stored in memory 228, as further described herein.

DEVIP is an IP address used by the remote device for a wireless connection such as a WiFi® or cellular network. SENTRYIP is assigned to the sentry. For example, the address can point to where the security proxy is listening on port :443 (222) for all data traffic. TUNIFIP is assigned to the virtual tunnel interface. This interface and DEVTUNIP can be in the same subnet e.g., the same class C or /24 subnet. By being located in the same subnet, the TUN becomes the default gateway for the device in the same subnet for return traffic originating from the server. SRVIP is assigned to the application server that the apps in the phone are attempting to access. Some of these IP addresses may be visible to external devices ("outer IP") while others may be visible only internally ("inner IP"). The nature of the IP addresses may be as follows:

TABLE 1

| Outer IP | Inner IP |
| --- | --- |
| DEVIP | DEVTUNIP |
| SENTRYIP | TUNIFIP |
| SRVIP | |

In operation, the security proxy is initialized, including: (i) creating a virtual interface that is accessible by a handle to intercept and redirect traffic and (ii) establishing a tunnel. In the example shown in FIG. 2A, the TUN interface 232 is created at initialization to receive output from FNAT and output to the stack 234. Tunnel 240 is established between tunnel plug-in 216 and listener 222. Secure connections (represented as the dashed double-head arrow) in the tunnel can conduct traffic between client app 214 and server 272.

In various embodiments, the security proxy 220 manages application traffic flow as follows. A packet is received by listener 222. FNAT is performed on the packet, which translates: (i) the source address (client app's IP address) to a general device IP address and (ii) the destination address (SRVIP) to a loopback IP address recognizable to the listener 236. The translation is stored in the memory 228. The packet is output by the FNAT 224 to the TUN interface 232. The TUN interface forwards the packet to the stack 234 using the loopback address. The stack forwards the packet to the listener 236. Upon receiving the packet, the listener determines the packet's original destination address by referring to the memory 228 (SRVIP in the example shown in FIG. 2A). The packet is then forwarded to the transport tunnel handler 238 (e.g., TCP or UDP), which may inject additional services. The tunnel handler then sends the packet to the network 270 where the packet can be read and processed by the server 272, where it can be read and processed by the network 270. In this manner, secure communications are made between the remote device 210 and server 272 in network 270. The security proxy enables the remote device 210 and the network 270 to use different types of VPN protocols (e.g., IP level or TCP level) and still be able to communicate with each other in a secure manner.

In various embodiments, the security proxy 220 manages application traffic flow in a direction opposite to that shown in FIG. 2A as follows. A return packet is received by tunnel handler 238. The tunnel handler 238, which may inject additional services, forwards the packet to listener 236, which forwards the packet to stack 234. The stack and TUN 232 cooperate to process packets in an ordered manner. When the packet bubbles to the bottom of the stack and reaches RNAT 226, the packet has a source address corresponding to the loopback IP address (for the listener 236) and a destination address of DEVTUNPOOLIP. RNAT is performed on the packet, which translates: (i) the destination address to the client app's IP address DEVTUNIP and (ii) the source address (loopback IP address) to SRVIP. The correlation is determined from the memory 228. The packet is output by the RNAT 226 to the listener 222. The listener 222 then forwards the packet to the client app 214 via tunnel 240. In this manner, secure communications are made between the network 270 and the remote device 210.

Figure 2B:
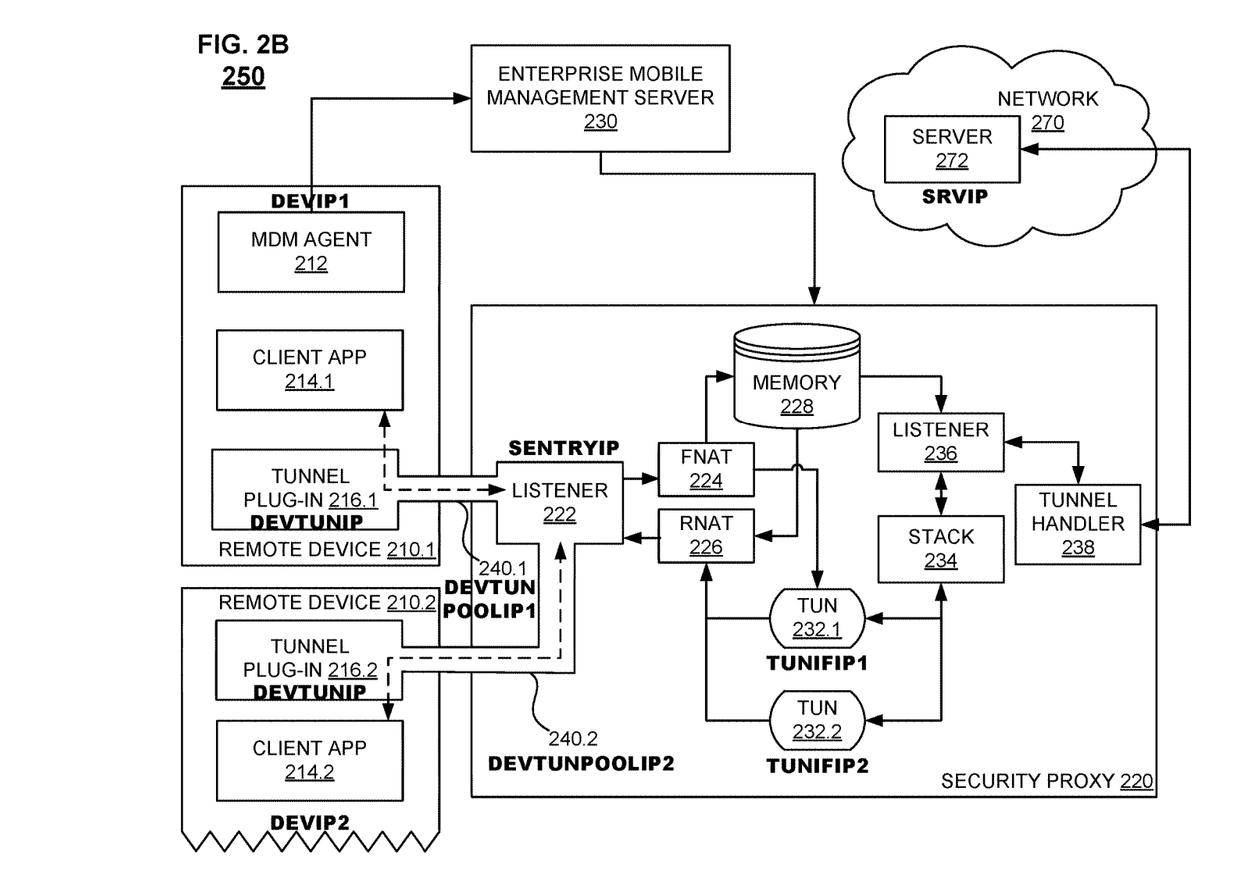
FIG. 2B is a block diagram illustrating an embodiment of a system for converting mobile traffic between different types of VPNs.

FIG. 2B is a block diagram illustrating an embodiment of a system 250 to provide secure mobile access to a network. The components of system 250 function like those of system 200 shown in FIG. 2A unless described otherwise.

The system 250 includes a plurality of remote devices 210.1, 210.2. Each remote device includes a tunnel plug-in 216.1, 216.2. Each tunnel plug-in can be in communication with a listener 222 of the security proxy 200 over a respective tunnel 240.1, 240.2. In the example shown, the system includes a plurality of TUNs 232.1, 232.2. TUN 232.1 corresponds to device 210.1 and TUN 232.2 corresponds to device 210.2. Multiple TUN interfaces can scale to a relatively large number of tunneled connections. In an example in which 64K connections are available for DEVTUNIP: port=>DEVTUNPOOLIP1:11111 (where a port is a 16 bit value), adding more pool IPs multiplies the pool of connections. Multiple TUN interfaces can increase parallel processing (e.g., one CPU core or thread can be dedicated to handling traffic from one TUN interface) within the proxy to improve performance. In an alternative embodiment, a TUN interface can serve multiple client devices. This is because the FNAT and RNAT have enough state to multiplex and demultiplex traffic.

In various embodiments, the address associated with tunnel 240.1 (DEVTUNPOOLIP1) is in the same subnet as the IP address of TUN 232.1 (TUNIFIP1). The address associated with tunnel 240.2 (DEVTUNPOOLIP2) is in the same subnet as the IP address of TUN 232.2 (TUNIFIP2). In this way, the TUN corresponding to the device will redirect traffic to the appropriate device. The remote devices 210.1 and 210.2 can have the same IP address (DEVTUNIP in the example shown). The addresses for the components of system 250 are summarized in Table 2.

TABLE 2

|  | Remote Device 210.1 | Remote Device 210.2 |
| --- | --- | --- |
| IP address on public network (e.g., WiFi ®/Cellular) | DEVIP1 | DEVIP2 |
| IP address assigned to the tunnel device when VPN is connected | DEVTUNIP | DEVTUNIP |
| IP address assigned from pool | DEVTUNPOOLIP1 | DEVTUNPOOLIP2 |

In various embodiments, a security proxy 220 may provide access to servers residing on two or more separate networks, such as corporate or other enterprise networks. In various embodiments, a plurality of security proxies such as security proxy 220 may be deployed and may be used to provide secure access to one or more internal networks, such as network 270.

Figure 3:
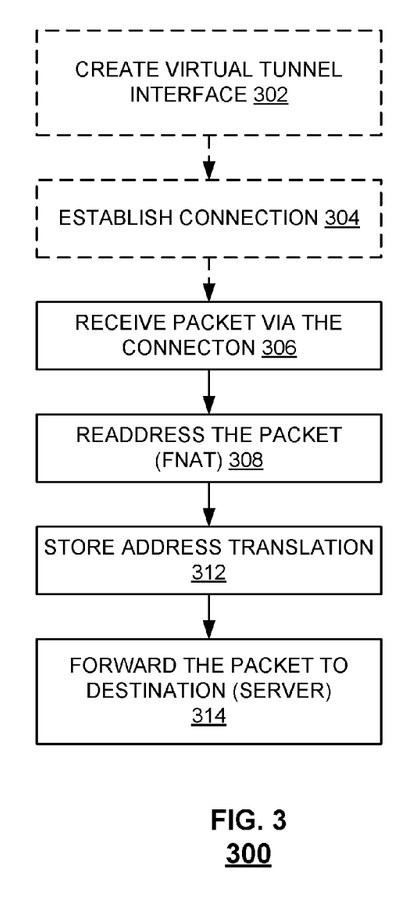
FIG. 3 is a flowchart illustrating a method of establishing a VPN and communicating using the VPN.

FIG. 3 is a flowchart illustrating an embodiment of a method 300 for converting mobile traffic between different types of VPNs. The method 300 can be performed by a security proxy such as the security proxy 120 shown in FIG. 1 or the security proxy 220 shown in FIGS. 2A and 2B. The method can be initiated upon authentication of the device, giving the device permission to establish a VPN connection with the server.

In 302, the method 300 initializes a security proxy. The initialization includes setting up a virtual network kernel device such as a TUN. For example, the TUN can be a Linux® TUN that operates on IP layer packets. The TUN can be set up according to an initialization script that creates a Linux® TUN interface and assigns an IP address (e.g., "TUNIFIP" shown in FIG. 2A) to the TUN. The assignment of the IP address to the TUN configures the TUN as a default destination device for return traffic, allowing for a return packet to be returned to the requesting device (e.g., a client app on the device). In some embodiments, the TUN's IP address (TUNIFIP) and the client app's IP address (DEVTUNIP) can be assigned such that they are in the same subnet. If the addresses are in the same subnet, traffic that passes through the subnet will be intercepted by the corresponding TUN interface so that return traffic will be returned to the corresponding client app.

In 304, the method establishes a connection. The connection can be established through a secure tunnel. For example, the security proxy can connect the remote device to the network by performing DNS resolution. Using the example of FIG. 2A, an app 214 on the device 210 attempts to connect to a server 272 (e.g., "server.example.com"). The attempt to connect will be accompanied by a DNS resolution request through tunnel 240 to the sentry. When the method receives the request, it resolves the name on behalf of the app and returns the IP address (SRVIP) to the device.

In embodiments in which a connection has already been established, a packet can be processed beginning at 306. In 306, the method receives a packet via the established connection. For example, an application in communication with the server transmits data as packets over the tunnel. In various embodiments, packets are transmitted when a device reads from and writes to a file handle (e.g., file descriptor).

The reading from and writing to the file handle allows the device to access a virtual interface (e.g., TUN 232 shown in FIG. 2A). The packet is handled by the virtual interface as further described herein.

In 308, the method readdresses the packet. Readdressing the packet redirects the packet and includes tracking an order of packets received in the data stream in a stack that maintains an order of received packets. For example, the stack is a Linux® stack. As another example, the stack is a (proprietary) TCP stack implemented by the security proxy. A TCP built in a user space can maintain an order of packets in the data stream. By readdressing the packet, the packet is not directly transmitted from device to server but instead is handled by the security proxy. The readdressing is further described herein, e.g., in relation to FIGS. 4A and 4B.

In 312, the address translation is stored. Storing the translation facilitates the redirection of return traffic to the correct device destination. Using the example of FIG. 2A, the address translation is stored in memory 228. In 314, the method forwards the packet to the server. Using the example of FIG. 2A, the packet is forwarded to server 272.

Figure 4A:
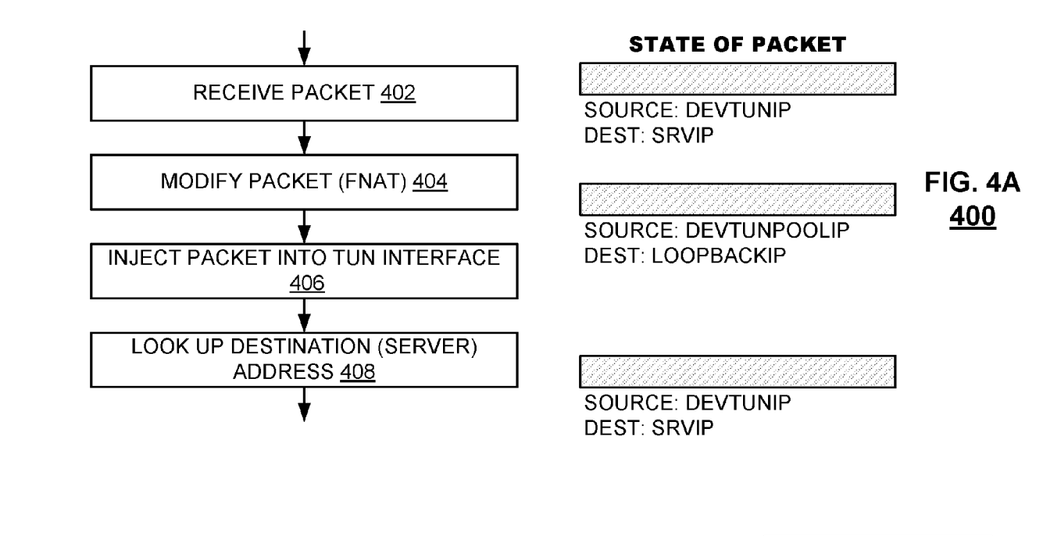
FIG. 4A is a flowchart illustrating an embodiment of a method for converting mobile traffic between different types of VPNs.

FIG. 4A is a flowchart illustrating an embodiment of a method 400 for converting mobile traffic between different types of VPNs. The method 400 can be performed as part of another method such as method 300 of FIG. 3. For example, the method 400 can be performed as part of step 308 of method 300. The method 400 can be performed by a security proxy such as the security proxy 120 shown in FIGS. 1 and 220 shown in FIGS. 2A and 2B.

In 402, the method receives a packet. The packet can include information about its source and destination. Using the example of system 200 shown in FIG. 2A, the source of the packet is client app 214 (address DEVTUNIP) and the destination is server 272 (address SRVIP). Returning to FIG. 4A, as shown, the received packet has source address DEVTUNIP and destination address SRVIP. The method then processes the packet with FNAT.

In 404, the method modifies the packet based on the FNAT. As shown, the source address is changed to DEVTUNPOOLIP and the destination address is changed to LOOPBACKIP. Corresponding ports can also be updated. For example, the LOOPBACKIP corresponds to port :11111. By changing the addresses, the packets are redirected within the security proxy for additional processing before forwarding to the destination server.

In 406, received packets are injected into the TUN interface via a file handle (FNAT) and pops out to the stack. In other words, on the server-side, the security proxy is a proxy and on the device-side, the security proxy is a listener. According to conventional socket processing, an order of the packets will be maintained by a stack.

In 408, the method looks up a destination IP and port. This information can be used to deliver the packet to its destination. As shown in FIG. 4A, the result of the lookup is source address DEVTUNIP and destination address SRVIP.

Using the example of FIG. 2B, a packet from client 214.1 is received via tunnel 240.1. The packet passes to FNAT 224 and the source address is changed to an address identifying the tunnel 240.1 (e.g., DEVTUNIP) and the destination address is changed to an address identifying the listener 236 (LOOPBACKIP, :11111). This information is stored in memory 228. The packet is then sent to TUN interface 232.1. The TUN interface and stack 234 cooperate to process the packet in an appropriate order. When the packet bubbles to the top of the stack it is destined for listener 236 because of destination address LOOPBACKIP. The listener 236 looks up the server destination for the packet from memory 228. The listener then updates the destination address as SRVIP and forwards the packet to tunnel handler 238. The tunnel handler can apply further functions to the packet, then forward the packet to the server 272.

Figure 4B:
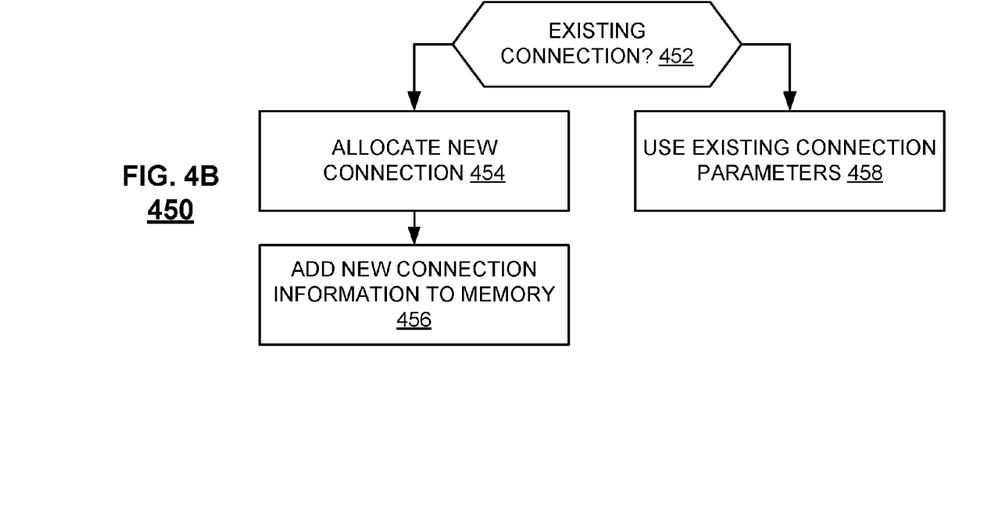
FIG. 4B is a flowchart illustrating an embodiment of a method for converting mobile traffic between different types of VPNs.

FIG. 4B is a flowchart illustrating an embodiment of a method 450 for converting mobile traffic between different types of VPNs. The method can be performed as part of another method such as method 400 of FIG. 4A. For example, the method 450 can be performed as part of step 404 of method 400. Method 450 allows the same IP address to be used for multiple devices. In some embodiments, a pool of IP addresses (e.g., 128 addresses) and corresponding ports are maintained. In 454, the allocation of a new flow includes assigning one of these addresses to the new flow (e.g., DEVTUNPOOLIP, pool_port). The same DEVTUNIP can be assigned to a plurality of devices (e.g., all devices), which simplifies routing and TUN interface management. For example, if there is a loss of power, all devices are reassigned the same address instead of looking up each individual address. As another example, for horizontal scaling, any number of proxies can be added to a load-balanced poll without handling state sharing across proxies. The method 450 can be performed by a security proxy such as the security proxy 220 shown in FIG. 2A.

In 452, the FNAT determines whether the connection already exists (e.g., has been established previously). The FNAT makes this determination by looking up the connection in memory. A connection exists if it can be found in a lookup table. If the connection exists, the method can use an existing flow address (458). If the connection does not exist, the method can allocate a new flow (454). The allocation of the new connection includes assigning an address to the source corresponding to the connection. In various embodiments, the address is selected from a pool of IP addresses and ports. In 456, the new connection is added to memory with keys and data.

Example keys are assigned as DEVIP, port; DEVTUNIP, port (where port is a port corresponding to the IP address). The forward flow data is assigned as DEVIP, port; DEVTUNIP, port; DEVNTUNPOOLIP, pool_port; and SRVIP, port. The reverse flow key is assigned as DEVTUNPOOLIP, pool_port.

Using the example of FIG. 2B, suppose connections corresponding to each of tunnel 240.1 and 240.2 do not yet exist. When a packet from client 214.1 is received, a flow corresponding to tunnel 240.1 is allocated and assigned the address DEVTUNPOOLIP1 and a corresponding port. The address and port are stored in memory 228. If another packet from client 214.1 is received, the connection will be determined to exist and DEVTUNPOOLIP1 is used. On the other hand, if a packet from client app 214.2 is received via 240.2, the method determines that the connection does not yet exist. The method allocates a new connection to tunnel 240.2 and assigns the DEVTUNPOOLIP2 to this new flow. In an embodiment, multiple TUNs service multiple connections, for example, in a one-to-one relationship. In an alternative embodiment, a same TUN can service multiple connections. The address and port are stored in memory 228.

Figure 5:
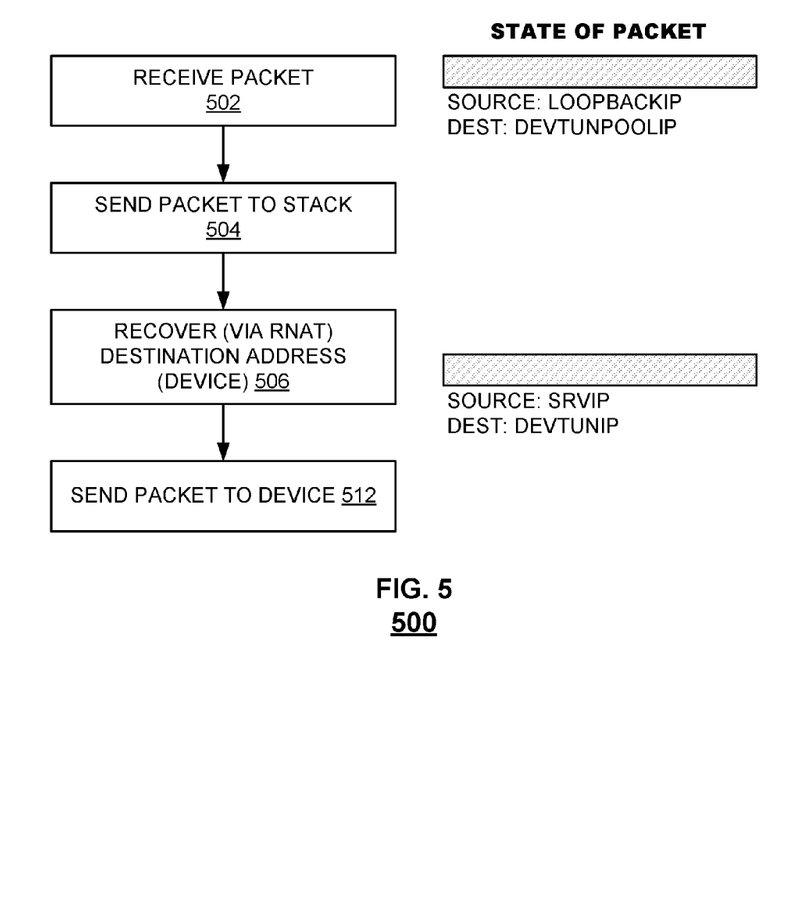
FIG. 5 is a flowchart illustrating an embodiment of a method for converting mobile traffic between different types of VPNs.

FIG. 5 is a flowchart illustrating an embodiment of a method 500 for converting mobile traffic between different types of VPNs. The method 500 is an example of how traffic from a VPN server is directed to a VPN client on a remote device, e.g., reverse communication to the traffic described for FIG. 4A. The method 500 can be performed by a security proxy such as the security proxy 120 shown in FIG. 1.

In 502, the method receives a packet. The packet can be received by a tunnel handler in a security proxy. The tunnel handler can forward the packet to a listener. The listener then forwards the packet to the stack (504). As described herein, the stack can be an IP stack. The packet can be sent according to conventional socket handling techniques.

In 506, when the packet reaches the bottom of the stack, a destination device address is determined for the packet. In various embodiments, the destination device address is determined using a RNAT. The RNAT provides a destination device allowing the packet to be routed to an appropriate tunnel to be transmitted to the intended client app on the destination device. The method then sends the packet to the device (512).

Using the example of FIG. 2A, a packet from server 272 is received by tunnel handler 238. The tunnel handler can apply further functions to the packet, then forward the packet to listener 236. The listener interface forwards the packet to the stack 234. The stack and TUN 232 cooperate to process the packet in an appropriate order. When the packet reaches the bottom of the stack and hits the TUN interface, RNAT picks up the packet and determines the device destination. The RNAT consults the memory 228 for the original device destination address and pool. The destination address is updated as DEVTUNIP. The packet is then transmitted via tunnel 240 to the client app 214.

The packet can be encoded as follows. At each layer, a header is added. Conventionally, a packet includes bits that are used in the header to indicate whether the packet includes control data or payload data. According to techniques of the present disclosure, these bits in the header can be saved. Rather than using bits to explicitly signal the nature of the packet, control information is encoded in the header. That is, the header can be overloaded to indicate whether the packet includes control or payload data, which avoids the additional bits dedicated to signaling whether the packet includes control or payload data. That is, existing IP encoding in a header indicates whether the packet is control or payload data. This technique of encoding packets advantageously reduces overhead.

In some embodiments, the methods described herein are performed on particular types of data packets, e.g., data packets but not control packets. To determine whether to perform the methods described herein on a particular packet, when an SSL stream is received, the security proxy determines whether the SSL stream is data or control. If the SSL stream is data, the methods described herein are performed. Otherwise, if the SSL stream is not data, the methods described herein are not performed.

In one aspect, when a security proxy server experiences a loss of functionality (e.g., power goes out, server goes down), using techniques disclosed herein, IP addresses can quickly be reassigned because a single (or few) address is used for multiple devices. Each device need not have a unique IP address. Conventionally, loss of functionality typically causes re-initialization and reassignment of IP addresses, which can be slow and inefficient.

In conventional systems, scaling, redundancy, and failure become complicated due to the shared state between servers. The techniques described herein are "stateless" and easily scalable because a Layer 2 state sharing and failover are not required. In other words, the proxying is application-level and thus secure connections are as scalable as web applications (more scalable than conventional VPN techniques).

The techniques described herein do not require large, complex devices such as conventional VPN servers to be deployed at a client's site. Instead, the techniques described herein implement at a higher level (application layer) and can use available hardware and software such as a Linux® stack, which is completely available in an application stack. The techniques described herein provide application level flexibility and are easier to develop (e.g., debug) compared with conventional VPNs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing secure access to a server, comprising:
   receiving, by a security proxy, a packet associated with a first client app on a device, wherein the first client app is configured to communicate using one of an IP virtual private network (VPN) protocol and a transport layer VPN protocol and the packet includes a source identifier for a source of the packet and a destination identifier for a destination of the packet, the destination being the server;
   reassigning a tunnel identifier as the source of the packet and a node identifier as the destination of the packet, the node identifier being associated with a node inside the security proxy;
   storing a correlation of the tunnel identifier, the source identifier, and the destination identifier;
   forwarding the packet to the node inside the security proxy;
   determining, using the correlation, the destination identifier;
   using the node to forward the packet to the destination in the server;
   receiving a packet associated with a second client app, wherein the second client app is configured to use the other one of the IP VPN protocol and the transport layer VPN protocol;
   determining whether a connection associated with the second client app has been established; and
   if the connection has not been established, establishing the connection and assigning a second tunnel identifier as a source of the packet associated with the second client app, wherein the second tunnel identifier is different from the tunnel identifier assigned to the first client app.

2. The method of claim 1, wherein the reassignment includes removing association of the packet with the source identifier and the destination identifier.

3. The method of claim 1, wherein the reassignment is performed using a network address translator to translate the destination identifier to the tunnel identifier.

4. The method of claim 1, wherein the storing includes caching the correlation.

5. The method of claim 1, wherein the forwarding is performed using a virtual tunnel interface.

6. The method of claim 1, wherein at least two devices connecting to the server use the source identifier.

7. The method of claim 1, wherein the tunnel identifier is selected from a pool of addresses.

8. The method of claim 1, further comprising:
   receiving a subsequent packet associated with the client app;
   wherein the reassigning includes using the tunnel identifier as a source of the subsequent packet.

9. The method of claim 1, wherein the source identifier is a device address and the destination identifier is a server address.

10. The method of claim 1, wherein the tunnel identifier is associated with a connection over which the packet is received.

11. The method of claim 1, wherein the node identifier is associated with a loopback address and the node includes a port.

12. The method of claim 1, further comprising:
    receiving a request to establish a connection over which the packet is receivable, the request being associated with the client app on the device;
    creating a virtual tunnel interface in the security proxy; and
    using a secure tunnel between the device and the security proxy to establish the connection.

13. The method of claim 12, wherein an address of the virtual tunnel interface is in a same subnet as the tunnel identifier.

14. The method of claim 12, wherein information associated with the secure tunnel is used to determine that the client app is authorized to access the server from the device and to obtain from an identity provider associated with the server a security token to be used by the client app to authenticate the server.

15. The method of claim 1, further comprising:
    receiving, by a port in the security proxy, a return packet associated with the server;
    determining a return tunnel identifier based on the port on which the return packet is received and the stored correlation;
    determining, using a network address translator, a return destination identifier based on the return tunnel identifier; and
    forwarding the return packet to the first client app.

16. A system for providing secure access to a server, comprising:
    a communication interface configured to receive a packet associated with a first client app on a device, wherein the first client app is configured to communicate using one of an IP virtual private network (VPN) protocol and a transport layer VPN protocol and the packet includes a source identifier for a source of the packet and a destination identifier for a destination of the packet, the destination being the server; and
    a processor coupled to the communication interface and configured to:
      reassign a tunnel identifier as the source of the packet and a node identifier as the destination of the packet, the node identifier being associated with a node inside the processor;
      store a correlation of the tunnel identifier, the source identifier, and the destination identifier;
      forward the packet to the node inside the processor;
      determine, using the correlation, the destination identifier;
      use the node to forward the packet to the destination in the server;
      receive a packet associated with a second client app, wherein the second client app is configured to use the other one of the IP VPN protocol and the transport layer VPN protocol;
      determine whether a connection associated with the second client app has been established; and
      if the connection has not been established, establish the connection and assign a second tunnel identifier as a source of the packet associated with the second client app, wherein the second tunnel identifier is different from the tunnel identifier assigned to the first client app.

17. The system of claim 16, wherein a virtual tunnel interface is in a same subnet as the tunnel identifier.

18. The system of claim 16, wherein a plurality of virtual tunnel interfaces corresponds to a plurality of devices and at least two of the plurality of devices use the source identifier.

19. A computer program product for providing secure access to a server, the computer program product being embodied in a non-transitory computer readable storage medium and comprising computer instructions for:
   receiving, by a security proxy, a packet associated with a first client app on a device, wherein the first client app is configured to communicate using one of an IP virtual private network (VPN) protocol and a transport layer VPN protocol and the packet includes a source identifier for a source of the packet and a destination identifier for a destination of the packet, the destination being the server;
   reassigning a tunnel identifier as the source of the packet and a node identifier as the destination of the packet, the node identifier being associated with a node inside the security proxy;
   storing a correlation of the tunnel identifier, the source identifier, and the destination identifier;
   forwarding the packet to the node inside the security proxy;
   determining, using the correlation, the destination identifier;
   using the node to forward the packet to the destination in the server, wherein the device is configured to communicate using one of an IP virtual private network (VPN) protocol and a transport layer VPN protocol;
   receiving a packet associated with a second client app, wherein the second client app is configured to use the other one of the IP VPN protocol and the transport layer VPN protocol;
   determining whether a connection associated with the second client app has been established; and
   if the connection has not been established, establishing the connection and assigning a second tunnel identifier as a source of the packet associated with the second client app, wherein the second tunnel identifier is different from the tunnel identifier assigned to the first client app.

20. The computer program product of claim 19, wherein at least two devices connecting to the destination use the source identifier.

* * * * *